Sept. 7, 1926.
B. S. AIKMAN
1,598,798
BRAKE VALVE DEVICE
Filed August 7, 1924
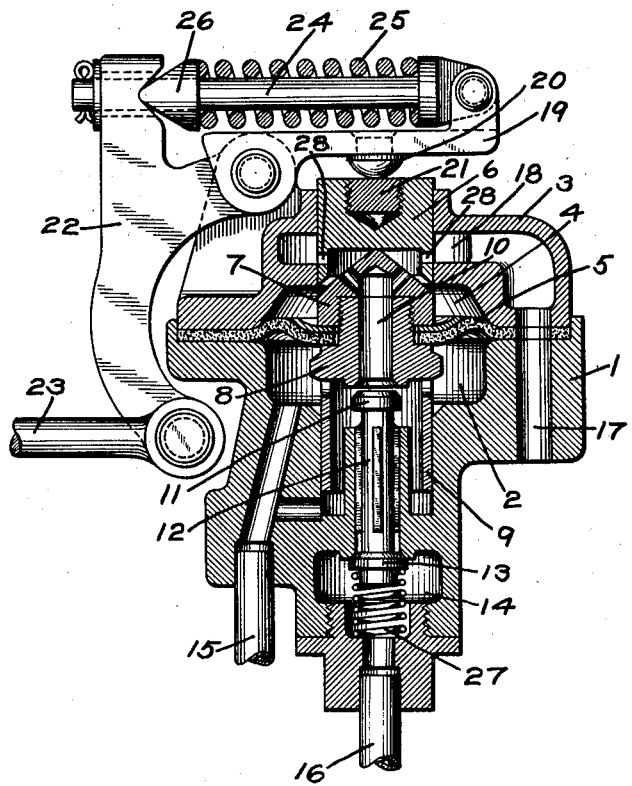
INVENTOR
BURTON S. AIKMAN
BY *Wm. M. Cady*
ATTORNEY Patented Sept. 7, 1926.

1,598,798

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

BRAKE-VALVE DEVICE.

Application filed August 7, 1924. Serial No. 730,599.

This invention relates to brake valve devices, and more particularly to a brake valve construction adapted for use in connection with a fluid pressure brake for automotive vehicles.

The principal object of my invention is to provide an improved brake valve device of the above character.

In the accompanying drawing, the single figure is a central sectional view of a brake valve device embodying my invention.

As shown in the drawing, the brake valve device may comprise a casing 1 having a chamber 2, a cover plate 3, having a chamber 4, and a flexible diaphragm 5 adapted to be clamped between the casing and the cover plate and separating the chambers 2 and 4.

The cover plate 3 is provided with a central bore for receiving a sliding member 6 and engaging said member is a member 7 which is secured at the central portion of diaphragm 5 by a nut 8, the member 7 having a sleeve extension 9 adapted to engage in a central bore of the casing 1 and serve as a guide for maintaining the parts in proper alinement.

The nut 8 is provided with a central bore 10 having a valve seat at the lower end for an exhaust valve 11 and at the lower end of the valve stem 12 of the exhaust valve is provided a fluid pressure supply valve 13, contained in valve chamber 14.

The diaphragm chamber 2 is connected by pipe 15 to a brake chamber (not shown), the admission of fluid under pressure to which is adapted to effect an application of the brakes. Valve chamber 14 is connected by pipe 16 to a source of fluid under pressure (not shown), and an atmospheric exhaust passage 17 is connected to an annular chamber 18 surrounding the member 6.

Pivotally mounted on the casing 1 is an arm 19 provided with a convex faced button 20 adapted to engage the member 6, said member being preferably provided with a hard metal insert 21 to provide a wear resisting contact face for said button. Also pivotally connected to the casing 1 is an operating lever 22, having connected to its lower end a rod 23, by which the lever 22 may be manually operated.

A spring guide rod 24 is pivotally connected to the free end of the arm 19 and loosely extends through an opening in the upper end of lever 22. Surrounding the rod 24 is a horizontally disposed coil spring 25, one end of which engages a shoulder associated with the rod 24 and having the other end in engagement with a spring follower block 26 having a V shaped end adapted to engage a V shaped notch in the upper end of the lever 22.

With the parts in release position, as shown in the drawing, the inlet valve 13 will be held seated by spring 27 and the diaphragm 5 will be in position, so that the exhaust valve 11 will be unseated.

When it is desired to apply the brakes, the rod 23 is manually shifted toward the left, so that the lever 22 is operated to effect movement of the arm 19, according to the pressure transmitted through the spring 25. The movement of arm 19 causes a downward movement of the member 6, so as to first cause the seat of exhaust valve 11 to engage said valve and the further movement to unseat the inlet valve 13. Fluid under pressure is then supplied from pipe 16 to pipe 15 so as to effect an application of the brakes.

The pressure of fluid supplied to the pipe 15 also acts in chamber 2 on diaphragm 5 and when the fluid pressure on the diaphragm slightly exceeds the pressure exerted by the spring 25 on the arm 19, the diaphragm will move up so as to permit the inlet valve 13 to seat, but not sufficiently to permit the exhaust valve 11 to unseat.

When it is desired to release the brakes, the rod 23 is released, so that the member 6 is relieved of pressure and then the pressure acting in chamber 2 will operate the diaphragm so that the exhaust valve 11 will be unseated, permitting fluid to escape from the pipe 15 and the brake chamber.

The exhaust of fluid from the brake chamber is also controlled by ports 28 in the member 6, so that when the member 6 is depressed, the exhaust communication will be closed. By this arrangement, if the exhaust valve 11 should fail to properly seat or if the diaphragm 5 should become ruptured, a brake application will not be prevented, since the exhaust is cut off by the closing of the ports 28 when the member 6 is moved sufficiently to open the inlet valve 13.

If the spring 25 should break, a brake application will still be obtained, since the spring, if broken, will still be maintained in position by the rod 24 and will still transmit pressure from the lever 22 to the arm 19.

Having now described my invention, what I claim as new and desire to secure by Letters Patent, is:—

A brake valve device comprising a casing, a movable abutment mounted in said casing, valves operated by said abutment for controlling the admission and exhaust of fluid under pressure, a member movable with said abutment, an arm pivoted to said casing and engaging said member, a lever pivoted to said casing and disposed at right angles to said arm, and a spring interposed between said arm and said lever and disposed in parallel relation to said arm.

In testimony whereof I have hereunto set my hand.

BURTON S. AIKMAN.